(12) United States Patent
Basak et al.

(10) Patent No.: US 10,304,099 B2
(45) Date of Patent: May 28, 2019

(54) VEHICLE-TO-VEHICLE ENERGY MARKET SYSTEM

(75) Inventors: Jayanta Basak, New Delhi (IN); Devasenapathi P. Seetharamakrishnan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1267 days.

(21) Appl. No.: 12/748,808

(22) Filed: Mar. 29, 2010

(65) Prior Publication Data

US 2011/0238519 A1    Sep. 29, 2011

(51) Int. Cl.
 *G06Q 30/06* (2012.01)
 *G06Q 30/08* (2012.01)

(52) U.S. Cl.
 CPC ............ *G06Q 30/06* (2013.01); *G06Q 30/08* (2013.01)

(58) Field of Classification Search
 CPC .......................................... G06Q 30/00–30/08
 USPC ................................. 705/26.1–27.2
 See application file for complete search history.

(56) References Cited

U.S. PATENT DOCUMENTS

| | | | |
|---|---|---|---|
| 5,951,229 A | 9/1999 | Hammerslag | |
| 2009/0030712 A1 | 1/2009 | Eogolea et al. | |
| 2011/0025267 A1* | 2/2011 | Kamen et al. | 320/109 |
| 2011/0202418 A1* | 8/2011 | Kempton | B60L 11/1824 705/26.1 |

FOREIGN PATENT DOCUMENTS

| | | |
|---|---|---|
| EP | 0548748 | 6/1993 |
| JP | 2000102102 | 4/2000 |
| JP | 2004062254 | 2/2009 |
| WO | 02074573 | 9/2002 |
| WO | 2008011434 | 1/2008 |
| WO | 2009067810 | 6/2009 |

OTHER PUBLICATIONS

"Vehicle to vehicle energy exchange in smart grid applications". Alvaro, Roberto; Gonzalez, Jairo; Gamallo, Carlos; Fraile-Ardanuy, Jesus; Knapen, Davy Luk. The Institute of Electrical and Electronics Engineers, Inc. (IEEE) Conference Proceedings (Nov. 2014): 178-184. Retrieved via ProQuest. (Year: 2014).*

* cited by examiner

*Primary Examiner* — Michael Misiaszek (74) *Attorney, Agent, or Firm* — Ference & Associates LLC (57) ABSTRACT

The use of a just-in-time market for EV's (electric vehicles) to buy and sell energy from each other directly. Such a market enables the following: sellers to advertise the amount of energy they are willing to sell and the minimum selling price; buyers to advertise the amount of energy they are interested in buying and the maximum buying price. The market works at any location and at any time as long as there is a buyer and seller. The communications are directly between buyers and sellers without the involvement of any third parties.

12 Claims, 7 Drawing Sheets

VEHICLE-TO-VEHICLE ENERGY MARKET SYSTEM

BACKGROUND

An electric vehicle (EV), also referred to as an electric drive vehicle, is a vehicle which uses one or more electric motors for propulsion. These vehicles are powered using electrical energy. A plug-in electric vehicle (PEV) is a type of EV with batteries that can be recharged by connecting a plug to an electric power source (such as wall sockets). The electricity may then be stored onboard the vehicle using a battery, flywheel, supercapacitor or fuel cell.

A Plug-in Hybrid Electric Vehicle (PHEV) is special type of PEV that combines a conventional Internal Combustion Engine (ICE) with an electric propulsion system. While there is a provision for fossil fuel use in PHEV's, they distinguish over Hybrid Electric Vehicles (HEV) in that the internal combustion engine alone is not the only source for recharging the battery—the recharging can easily be accomplished by plugging into or otherwise connecting to an electrical power source.

Most EVs on the road today are passenger cars, but there are also PHEV versions of commercial passenger vans, utility trucks, school buses, motorcycles, scooters, and military vehicles. In this document, the term "vehicle" is used to represent any vehicle that can be electrically powered and externally charged.

Generally, the cost for electricity to power electric vehicles has been estimated at less than one quarter of the cost of gasoline. As has been much appreciated, compared to conventional vehicles, EVs can reduce air pollution, dependence on petroleum, and greenhouse gas emissions that contribute to global warming. Even plug-in hybrids use no fossil fuel during their all-electric range if their batteries are charged from nuclear or renewable energy sources.

Other benefits include improved national energy security (due to less dependence on foreign oil), fewer fill-ups at the filling station, the convenience of home recharging, opportunities to provide emergency backup power in the home, and vehicle to grid applications. Given the benefits of EVs, major automobile manufacturers have scheduled, or announced an intention to schedule, the production of EV automobiles in coming years.

Generally, the frequency of recharging an EV is determined by the average distance driven per day and the energy efficiency (miles per unit of energy) of the vehicle. However, the vehicle owners may not get the necessary electrical energy at the best price at the location when they want to recharge because utility companies, to protect themselves from widely fluctuating costs and to reduce peak demands, have started introducing various time-based pricing mechanisms such as Time Of Use (TOU), Critical Peak Pricing (CPP), Real Time Pricing (RTP) and Peak Load Reduction Credits (PLRC) etc.

BRIEF SUMMARY

Broadly contemplated herein, in accordance with at least one presently preferred embodiment of the present invention, is a just-in-time market for EV's to buy and sell energy from each other directly. Such a market enables the following: sellers to advertise the amount of energy they are willing to sell and the minimum selling price; buyers to advertise the amount of energy they are interested in buying and the maximum buying price. The market works at any location and at any time as long as there is a buyer and a seller. The communications are directly between buyers and sellers without the involvement of any third parties.

In summary, one aspect of the invention provides a method comprising: ascertaining an electric energy imbalance in a vehicle at least partly powered by electric power; broadcasting the imbalance to one or more other vehicles; the broadcasting comprising broadcasting an opening price for energy to redress the imbalance; listening for one or more bids from the one or more other vehicles; deciding on whether to accept a bid from another vehicle; and collecting identifying information from a vehicle from which a bid is accepted.

Another aspect of the invention provides an apparatus comprising: one or more processors; and a computer readable storage medium having computer readable program code embodied therewith and executable by the one or more processors, the computer readable program code comprising: computer readable program code configured to ascertain an electric energy imbalance in a vehicle at least partly powered by electric power; computer readable program code configured to broadcast the imbalance to one or more other vehicles and broadcast an opening price for energy to redress the imbalance; listening for one or more bids from the one or more other vehicles; computer readable program code configured to decide on whether to accept a bid from another vehicle; and computer readable program code configured to identify information from a vehicle from which a bid is accepted.

An additional aspect of the invention provides a computer program product comprising: a computer readable storage medium having computer readable program code embodied therewith, the computer readable program code comprising: computer readable program code configured to ascertain an electric energy imbalance in a vehicle at least partly powered by electric power; computer readable program code configured to broadcast the imbalance to one or more other vehicles and broadcast an opening price for energy to redress the imbalance; listening for one or more bids from the one or more other vehicles; computer readable program code configured to decide on whether to accept a bid from another vehicle; and computer readable program code configured to identify information from a vehicle from which a bid is accepted.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, combinations of blocks in the block diagrams and/or flowchart illustration, can be implemented by special purpose hardware-based systems that perform the specified functions or acts, or combinations of special purpose hardware and computer instructions.

Figure 1:
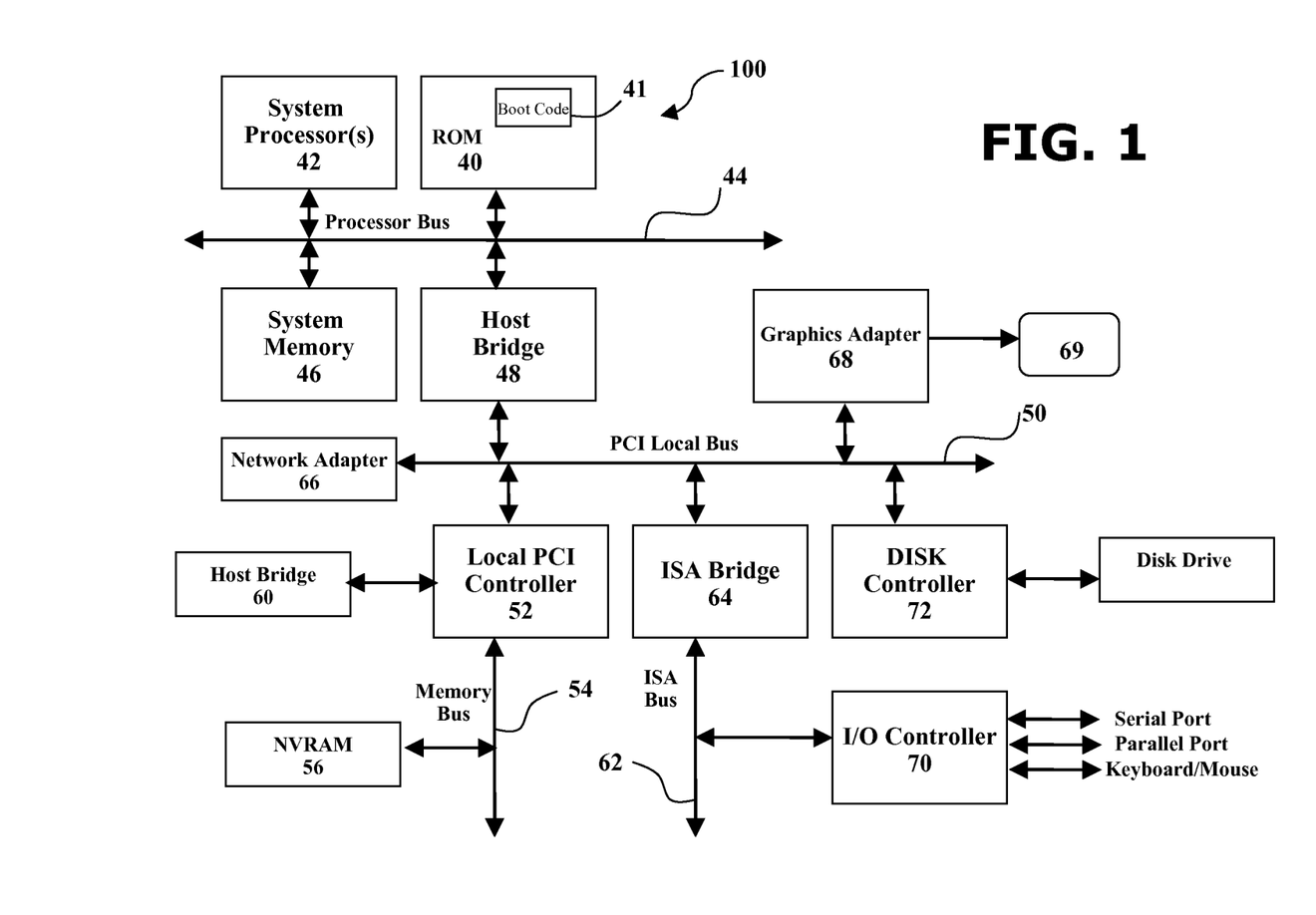
FIG. 1 illustrates a computer system.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

The system 100 shown in FIG. 1 is but an example of a computer system that could be used on a vehicle on-board in order to undertake the transactions described herein, or that could be used remotely from one or more vehicles to control or manage the transactions described herein. Other suitable computer systems for use in accordance with embodiments of the present invention can be employed within the scope of embodiments of the present invention.

Figure 2:
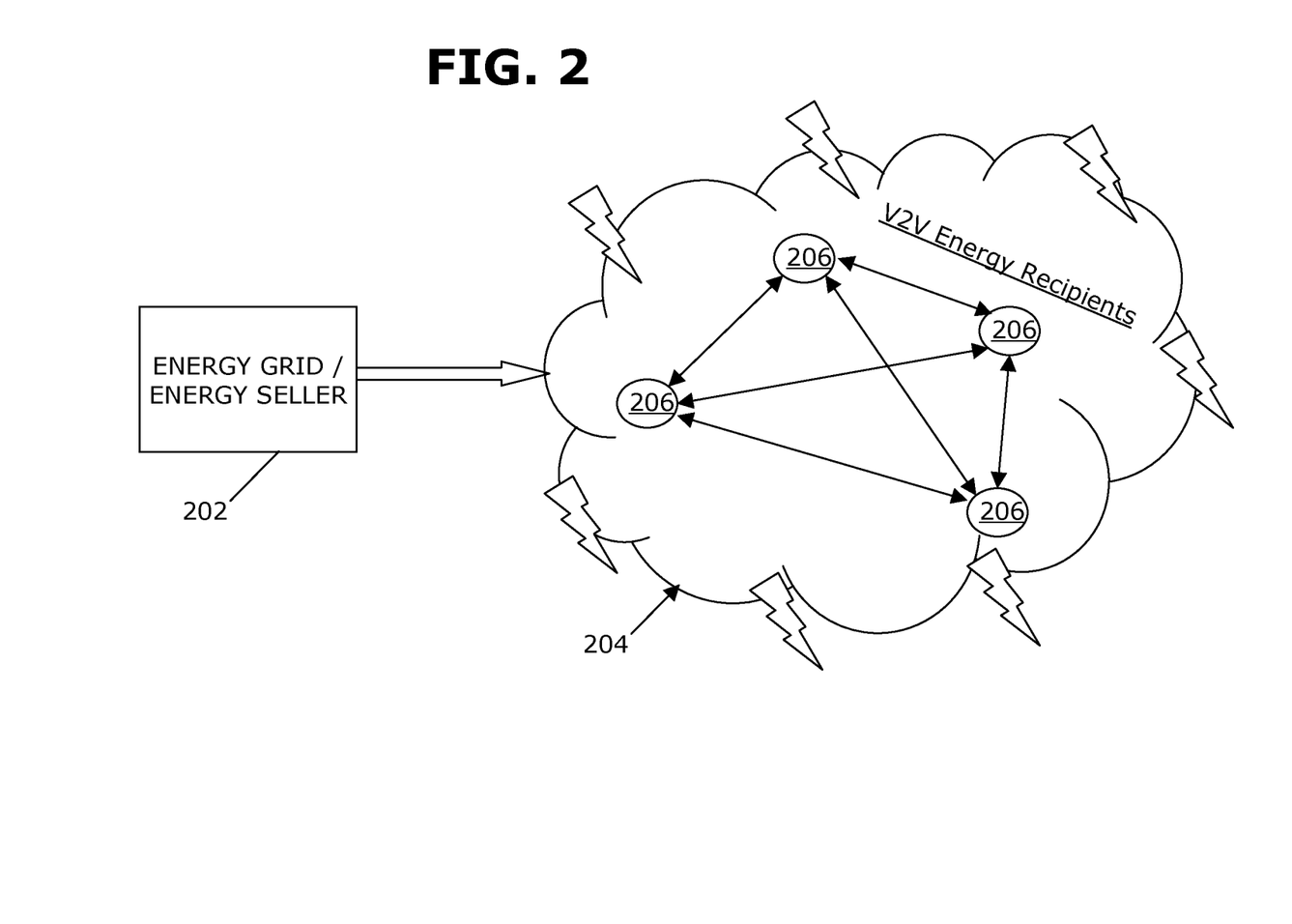
FIG. 2 provides a general schematic overview of a vehicle-to-vehicle energy market system.

FIG. 2 schematically illustrates an arrangement generally contemplated in accordance with embodiments of the present invention. As shown, the energy grid (or energy seller) 202 provides energy to a network 204 of recipients (vehicles) 206. In accordance with embodiments of the invention, vehicles 206 will be able to offer electrical energy to one another.

It should be appreciated that a vehicle-to-vehicle energy market system can provide tremendous efficiencies. Particularly, if an effort were made to sell the energy back to the grid 202, then the grid 202 would need to support two way energy flows. This would result in a highly inefficient process, as a substantial amount of energy would be lost in conversion processes—AC to DC (when the vehicle was charged) and DC to AC (when selling the energy to AC grids).

Figure 3:
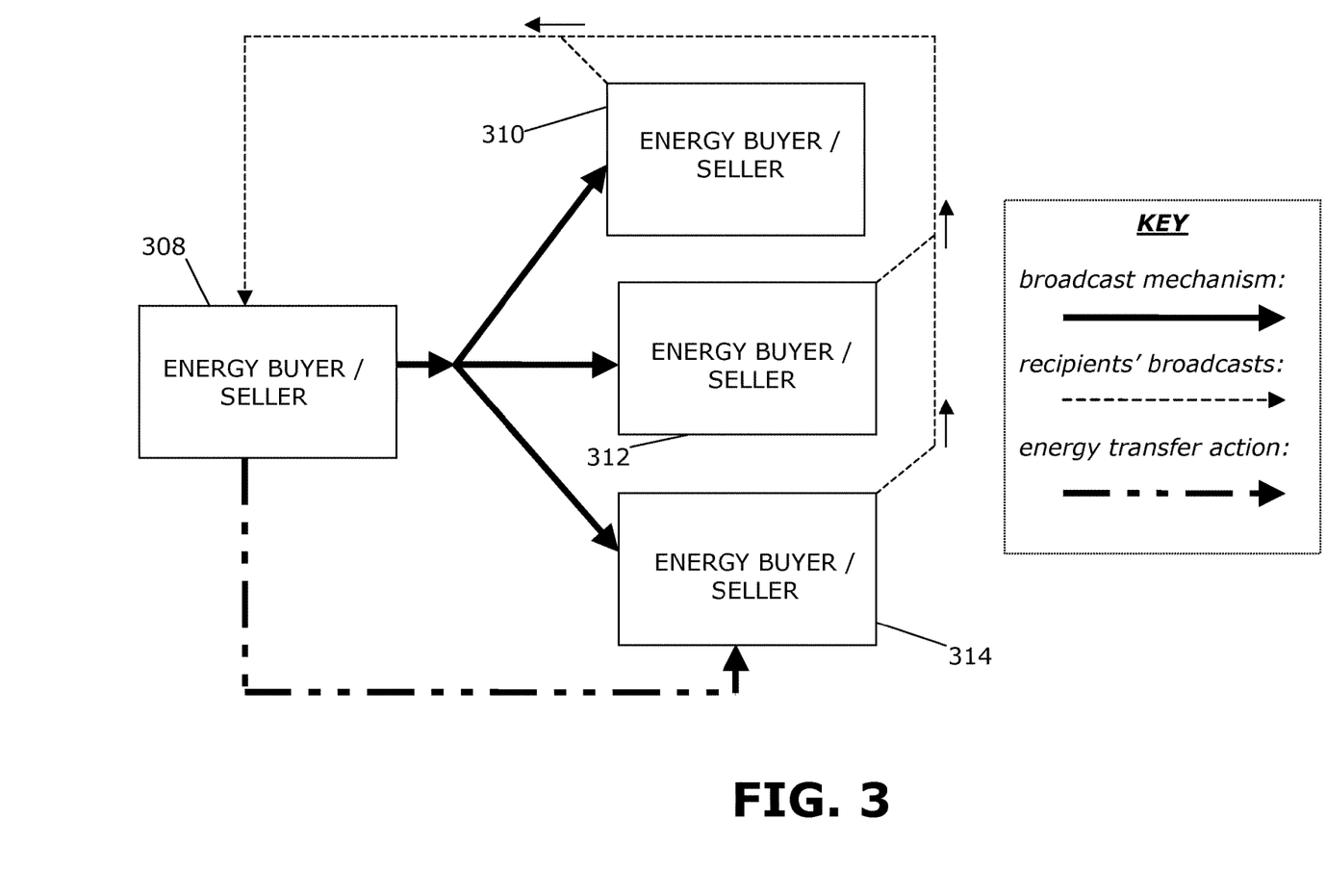
FIG. 3 provides a particular schematic overview of a vehicle-to-vehicle energy market system.

FIG. 3 provides a more particular schematic overview of a vehicle-to-vehicle market system. In accordance with preferred embodiments of the invention, consider an illustrative example with four energy buyers/sellers in the form of vehicles. 308/310/312/314. In a preferred embodiment, vehicle 308 broadcasts an offer or request to the other vehicles 310/312/314. Each of the vehicles 310/312/314 sends a return message to vehicle 308, at which point vehicle 308 transfers energy to a selected one of the vehicles (in this case, vehicle 314).

Generally, there is broadly contemplated herein, in accordance with preferred embodiments of the invention, a system in which every participating vehicle has the following components:

An energy storage such as battery and optionally a charger. (A vehicle that is not going to sell energy would not require a charger.)

A mechanism/circuit to measure the amount of remaining charge in the vehicle's energy storage.

An embedded computer that contains the software for handling transactions.

A wireless transceiver e.g., (UWB/WiFi/Zigbee/WiMax etc) to communicate with other vehicles.

A user interface (including displays, buttons, etc) to interact with a human operator A perceivable unique identifier (PUID) such as a license plate A localization system (explained below) that would help the seller and buyer locate each other.

Optionally, a GPS to determine the vehicle's location.

Figure 4A:
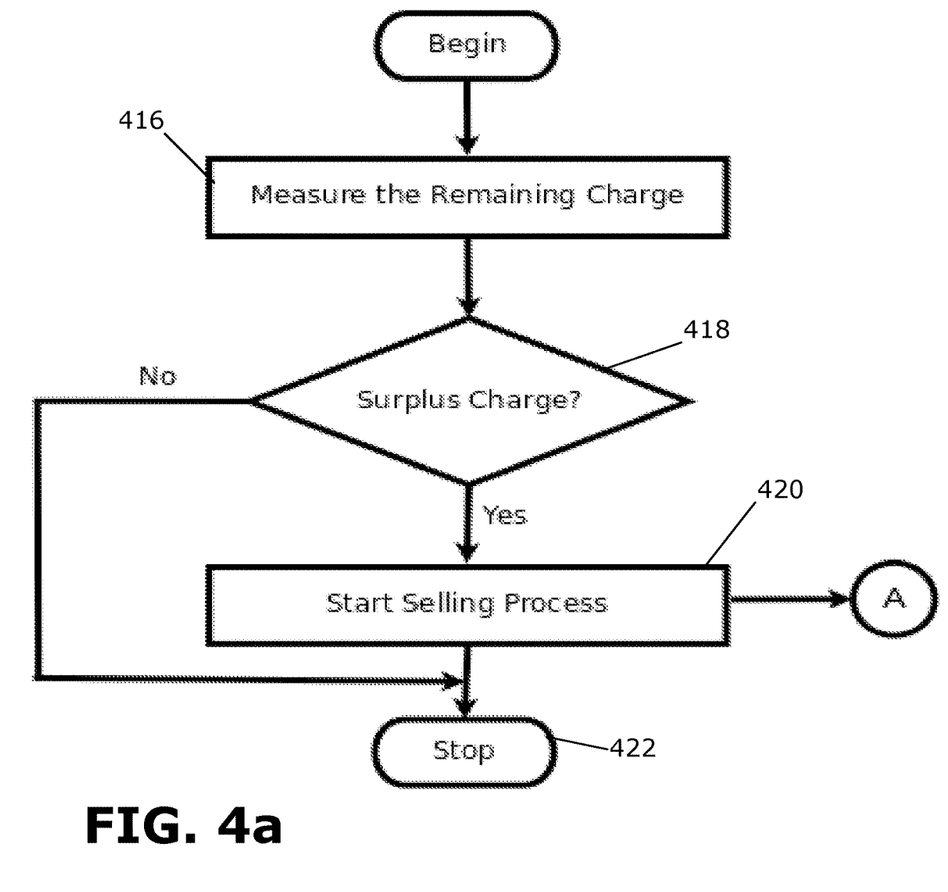
FIGS. 4a and 4b jointly depict a process via which a vehicle sells energy to other vehicles.
Figure 4B:
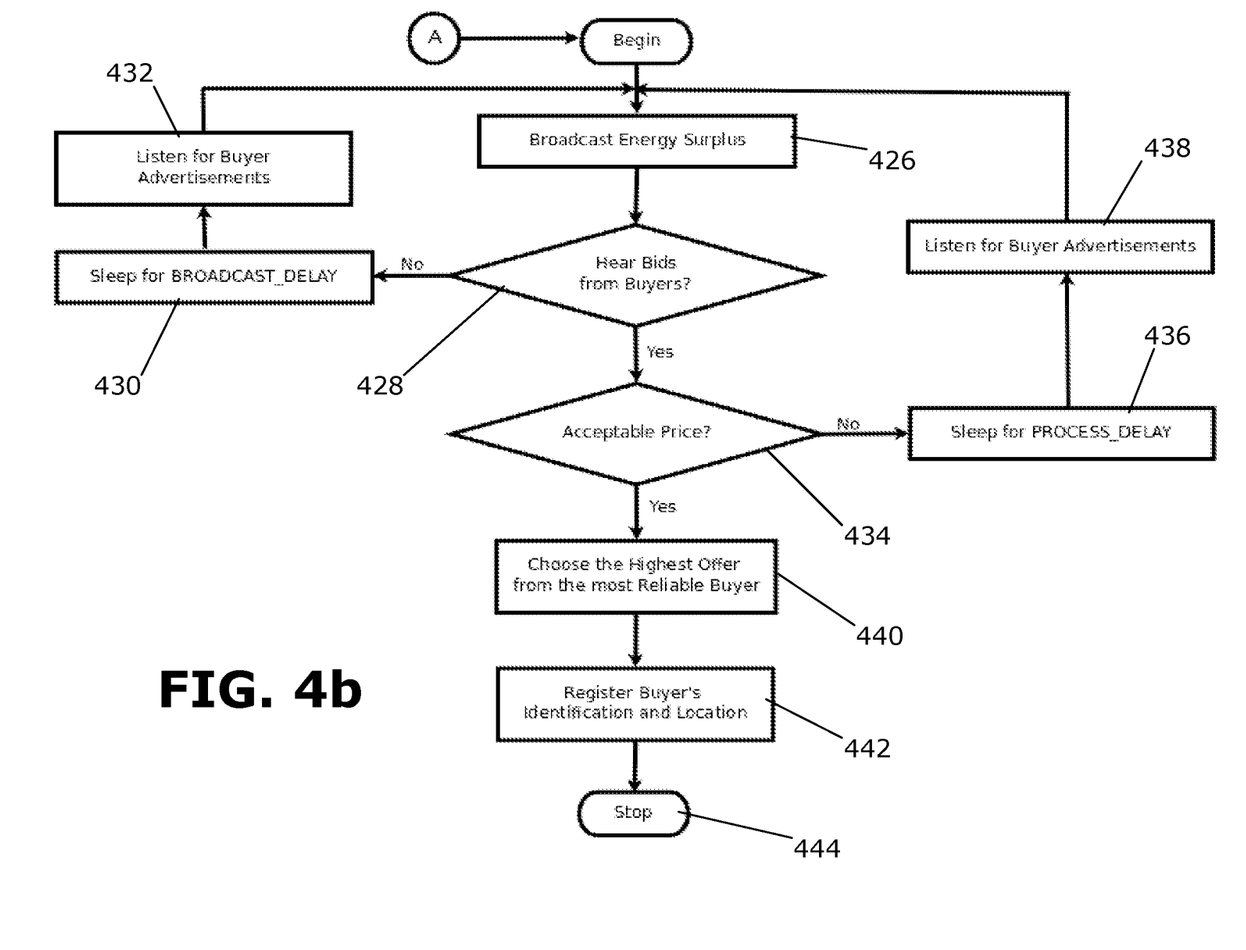

FIGS. 4a and 4b jointly depict a process via which, in accordance with an example embodiment, a vehicle sells energy to other vehicles. Reference will be made to both FIGS. 4a and 4b jointly.

First, the vehicle that is to sell measures the amount of energy available in its storage, that is, its remaining charge (416). If (418) the amount of energy is more than the preset threshold for selling, it would proceed to start the selling process (420); if not, the process stops (422).

In starting the selling process, the vehicle broadcasts, e.g., over its wireless network a message regarding its surplus (426) along with information including the vehicle's unique id, the amount of energy available for sale and an opening price for a given unit of energy (e.g., 1 KWH). The broadcasting vehicle then listens for bids from potential buyers (428). If there is no response, a broadcast delay is traversed (430) until one or more potential buyer advertisements are broadcast (432). If, however, there is a response from any party interested in buying energy, it could either (434) accept the offer or wait for an offer that is greater than or equal to the minimum expected price set by the user. If the latter, the broadcasting vehicle sleeps (436) for a process delay until one or more potential buyer advertisements are broadcast (438).

If it accepts the offer, which in a preferred embodiment is the highest offer from the most reliable buyer (440), a registration takes place (442), where it would record the unique id of the bidder, the offered price and the amount of energy required.

In a preferred embodiment of the invention, the entire process described above is repeated until all surplus energy is sold off.

As a general consideration, it is also possible for a selling vehicle to respond after listening to purchase requests from other vehicles instead of broadcasting its offer proactively (see steps 432/438, above).

Figure 5A:
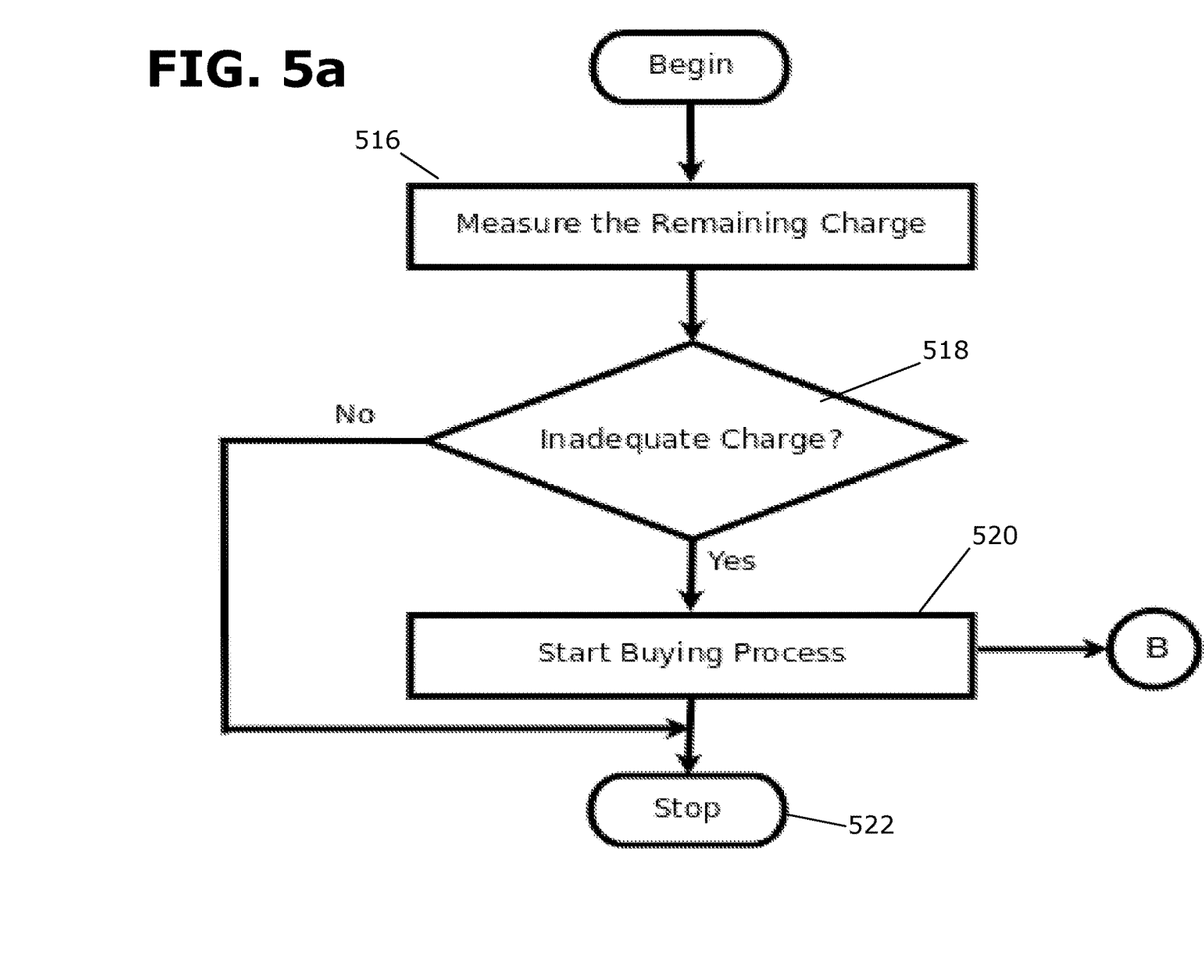
FIGS. 5a and 5b jointly depict a process via which a vehicle buys energy from other vehicles.
Figure 5B:
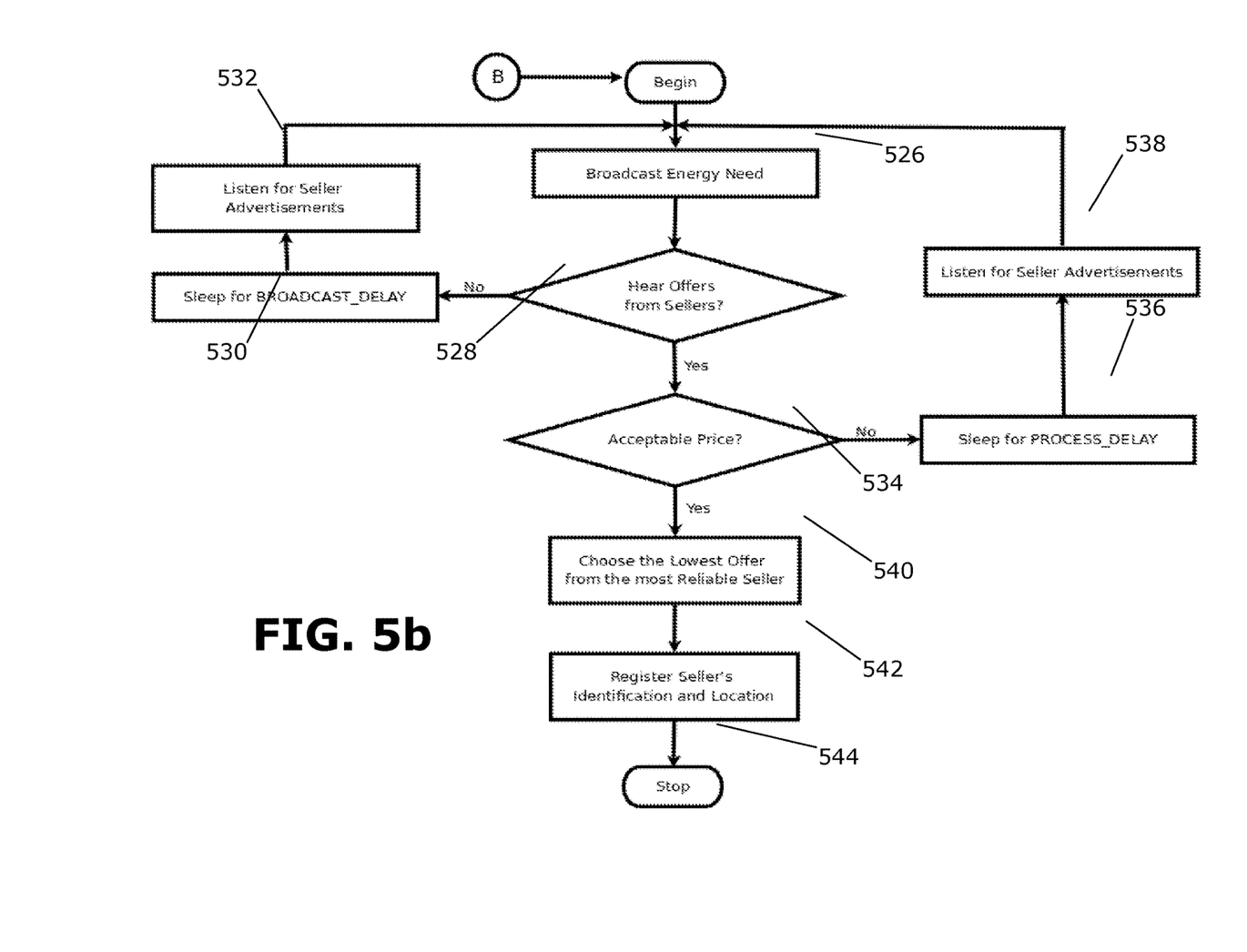

FIGS. 5a and 5b, for their part, jointly depict a process via which, in accordance with an example embodiment, a vehicle buys energy from other vehicles. Reference will be made to both FIGS. 5a and 5b jointly.

First, the vehicle that is to buy measures the amount of energy available in its storage, that is, its remaining charge (516). If (518) the amount of energy is less than a preset threshold for buying, it would proceed to start the buying process (520); if not, the process stops (522).

In starting the selling process, the vehicle broadcasts, e.g., over its wireless network a message regarding its deficit or need (526) along with information including the vehicle's unique id, the amount of energy desired or required and an opening price for a given unit of energy (e.g., 1 KWH). The broadcasting vehicle then listens for bids from potential sellers (528). If there is no response, a broadcast delay is traversed (530) until one or more potential seller advertisements are broadcast (532). If, however, there is a response from any party interested in selling energy, it could either (534) accept the offer or wait for an offer that is less than or equal to the maximum expected price set by the user. If the latter, the broadcasting vehicle sleeps (536) for a process delay until one or more potential buyer seller advertisements are broadcast (538).

If it accepts the offer, which in a preferred embodiment is the lowest offer from the most reliable seller (540), a registration takes place (542), where it would record the unique id of the bidder, the offered price and the amount of energy required.

In a preferred embodiment of the invention, the entire process described above is repeated until all energy requirements of the broadcasting vehicle are met As a general consideration, it is also possible for a buying vehicle to respond after listening to selling requests from other vehicles instead of broadcasting its offer proactively (see steps 532/538, above).

Other considerations, such as locating vehicles that have closed a deal, can come into play in accordance with embodiments of the invention. Particularly, drivers of two vehicles that closed a deal need to locate each other for transferring the energy and closing the payment. In an example embodiment, a driver can locate the other vehicle by using a simple mechanism such as the license plate number as the unique id.

The localization mechanism can also be more sophisticated. For example, a vehicle can respond when its unique identifier is transmitted by the other party. The other party could transmit the identifiers over a wireless network (similar to keyless entry mechanism). If the vehicles are not in the vicinity of each other, they can transmit their GPS coordinate to other vehicle.

By way of completing the transaction, once the two drivers locate each other, the two vehicles can transfer energy using wireless mechanisms or using power cables. The buyer can pay the seller by handing cash or using mobile electronic payments. Once the agreed upon energy is transferred, the vehicles can update their records accordingly.

Intelligent agents may be employed in accordance with embodiments of the invention. Particularly, intelligent agents running on vehicles' embedded computers could handle most parts of bidding/selling/advertising. Such agents could also perform the following:

Identify the best time and place to sell and buy energy. Based on the transaction history at different times and locations, they could determine the best location and time for trading.

Compute the future energy needs of the vehicle so appropriate selling and buying decisions can be made. For instance, the agents can determine the travel plans of the user through the user's calendar.

Keep track of all transaction histories for building a profile of the trading partners. For instance, if a vehicle accepts bids and leaves without closing the transaction or notifying, that vehicle could be treated as an unreliable trading partner in the future transactions.

Learning the prevailing prices by passively listening to other trades in the vicinity.

By way of other considerations, in accordance with embodiments of the invention a PHEV can buy energy from the grid at a lower price (time-of-the-day pricing of the grid), and may sell energy to other PHEV at a lower cost at the peak period. Similarly, a PHEV can buy energy from another PHEV at a lower price at the peak period.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    utilizing a processor of a computer embedded in an electric vehicle, the electric vehicle having an energy storage and a circuit to measure the amount of remaining charge in the energy storage and at least partly powered by electric power from the energy storage to execute computer code configured to perform the steps of:
    ascertaining an electric energy imbalance in the electric vehicle, wherein the ascertaining comprises measuring, with the circuit, an amount of energy available in the energy storage; and comparing the amount of energy available with a preset threshold;
    in response to determining that the amount of energy available exceeds the threshold, performing the following steps directly with respect to one or more other electric vehicles at least partly powered by electric power:
  broadcasting the imbalance to one or more other electric vehicles, wherein the broadcasting comprises broadcasting a message regarding a surplus of energy over a wireless network of the electric vehicle;
  said broadcasting comprising broadcasting an opening price to sell the surplus energy and an amount of energy corresponding to the surplus;
  listening, using the wireless network, for one or more advertisements comprising bids to purchase the surplus of energy from the one or more other electric vehicles, wherein the bids comprise a price with regard to the surplus;
  deciding on whether to accept a bid from another electric vehicle, wherein the deciding comprises comparing the price of the bid with the opening price and accepting a bid associated based upon the price of the bid and a reliability of the another electric vehicle providing the bid;
  collecting identifying information from a purchasing electric vehicle having a deficit of electric energy from which a bid is accepted, wherein the collecting comprises recording an identification of the electric vehicle from which a bid is accepted, an accepted price for the electrical energy, and an amount of energy for transfer; and
  transferring, based upon the accepted bid and using the identifying information, electrical energy from the electric vehicle having the surplus of electric energy to the purchasing electric vehicle having a deficit of electric energy;
in response to determining that the amount of energy available falls below the threshold performing the following steps directly with respect to one or more other electric vehicles at least partly powered by electric power:
  broadcasting the imbalance to one or more other electric vehicles, wherein the broadcasting comprises broadcasting a message regarding a deficit of energy over a wireless network of the electric vehicle;
  said broadcasting comprising broadcasting an opening price to purchase surplus energy and an amount of energy corresponding to the deficit;
  listening, using the wireless network, for one or more advertisements comprising bids to sell energy to redress the deficit from the one or more other electric vehicles, wherein the bids comprise a price with regard to the deficit;
  deciding on whether to accept a bid from another electric vehicle, wherein the deciding comprises comparing the price of the bid with the opening price and accepting a bid associated based upon the price of the bid and a reliability of the another electric vehicle providing the bid;
  collecting identifying information from a selling electric vehicle having a surplus of electric energy from which a bid is accepted, wherein the collecting comprises recording an identification of the electric vehicle from which a bid is accepted, an accepted price for the electrical energy, and an amount of energy for transfer; and
  transferring, based upon the accepted bid and using the identifying information, electrical energy from the selling electric vehicle having a surplus of electric energy to the electric vehicle having a deficit of electric energy.

2. The method according to claim 1, wherein the vehicle at least partly powered by electrical power is a plug-in hybrid electric vehicle.

3. The method according to claim 1, wherein the vehicle at least partly powered by electrical power is a plug-in electric vehicle.

4. The method according to claim 1, wherein said broadcasting ceases upon lack of response from other vehicles after a predetermined period of time and initiates a broadcast sleep period.

5. The method according to claim 4, further comprising waking from the sleep period responsive to a broadcast from another vehicle.

6. An apparatus comprising:
  one or more processors of a computer embedded in an electric vehicle, the electric vehicle having an energy storage and a circuit to measure the amount of remaining charge in the energy storage and at least partly powered by electric power from the energy storage; and
  a non-transitory computer readable storage medium having computer readable program code embodied thereon and executable by the one or more processors, the computer readable program code being configured to, when executed, cause the one or processors to perform operations comprising:
  ascertaining an electric energy imbalance in the electric vehicle, wherein the ascertaining comprises measuring, with the circuit, an amount of energy available in the energy storage; and comparing the amount of energy available with a preset threshold;
  in response to determining that the amount of energy available exceeds the threshold, performing the following steps directly with respect to one or more other electric vehicles at least partly powered by electric power:
    broadcasting the imbalance to one or more other electric vehicles, wherein the broadcasting comprises broadcasting a message regarding a surplus of energy over a wireless network of the electric vehicle;
    said broadcasting comprising broadcasting an opening price to sell the surplus energy and an amount of energy corresponding to the surplus;
    listening, using the wireless network, for one or more advertisements comprising bids to purchase the surplus of energy from the one or more other electric vehicles, wherein the bids comprise a price with regard to the surplus;
    deciding on whether to accept a bid from another electric vehicle, wherein the deciding comprises comparing the price of the bid with the opening price and accepting a bid associated based upon the price of the bid and a reliability of the another electric vehicle providing the bid;
    collecting identifying information from a purchasing electric vehicle having a deficit of electric energy from which a bid is accepted, wherein the collecting comprises recording an identification of the electric vehicle from which a bid is accepted, an accepted price for the electrical energy, and an amount of energy for transfer; and
    transferring, based upon the accepted bid and using the identifying information, electrical energy from the electric vehicle having the surplus of electric energy to the purchasing electric vehicle having a deficit of electric energy;

in response to determining that the amount of energy available falls below the threshold, performing the following steps directly with respect to one or more other electric vehicles at least partly powered by electric power:

broadcasting the imbalance to one or more other electric vehicles, wherein the broadcasting comprises broadcasting a message regarding a deficit of energy over a wireless network of the electric vehicle;

said broadcasting comprising broadcasting an opening price to purchase surplus energy and an amount of energy corresponding to the deficit;

listening, using the wireless network, for one or more advertisements comprising bids to sell energy to redress the deficit from the one or more other electric vehicles, wherein the bids comprise a price with regard to the deficit;

deciding on whether to accept a bid from another electric vehicle, wherein the deciding comprises comparing the price of the bid with the opening price and accepting a bid associated based upon the price of the bid and a reliability of the another electric vehicle providing the bid;

collecting identifying information from a selling electric vehicle having a surplus of electric energy from which a bid is accepted, wherein the collecting comprises recording an identification of the electric vehicle from which a bid is accepted, an accepted price for the electrical energy, and an amount of energy for transfer; and transferring, based upon the accepted bid and using the identifying information, electrical energy from the selling electric vehicle having a surplus of electric energy to the electric vehicle having a deficit of electric energy.

7. The apparatus according to claim 6, wherein the vehicle at least partly powered by electrical power is a plug-in electric vehicle.

8. The apparatus according to claim 6, wherein the vehicle at least partly powered by electrical power is a plug-in electric vehicle.

9. The apparatus according to claim 6, wherein said computer readable program code is further configured to cause the one or more processors to cease broadcasting upon lack of response from other vehicles after a predetermined period of time and initiate a broadcast sleep period.

10. The apparatus according to claim 9, wherein said computer readable program code is further configured to cause the one or more processors to wake from the sleep period responsive to a broadcast from another vehicle.

11. A computer program product comprising:

a non-transitory computer readable storage medium having computer readable program code embodied thereon, the computer readable program code being configured to, when executed, cause one or processors of a computer embedded in an electric vehicle, the electric vehicle having an energy storage and a circuit to measure the amount of remaining charge in the energy storage and at least partly powered by electric power from the energy storage to perform operations comprising:

ascertaining an electric energy imbalance in the electric vehicle, wherein the ascertaining comprises measuring, with the circuit, an amount of energy available in the energy storage; and comparing the amount of energy available with a preset threshold;

in response to determining that the amount of energy available exceeds the threshold, performing the following steps directly with respect to one or more other electric vehicles at least partly powered by electric power:

broadcasting the imbalance to one or more other electric vehicles, wherein the broadcasting comprises broadcasting a message regarding a surplus of energy over a wireless network of the electric vehicle;

said broadcasting comprising broadcasting an opening price to sell the surplus energy and an amount of energy corresponding to the surplus;

listening, using the wireless network, for one or more advertisements comprising bids to purchase the surplus of energy from the one or more other electric vehicles, wherein the bids comprise a price with regard to the surplus;

deciding on whether to accept a bid from another electric vehicle, wherein the deciding comprises comparing the price of the bid with the opening price and accepting a bid associated based upon the price of the bid and a reliability of the another electric vehicle providing the bid;

collecting identifying information from a purchasing electric vehicle having a deficit of electric energy from which a bid is accepted, wherein the collecting comprises recording an identification of the electric vehicle from which a bid is accepted, an accepted price for the electrical energy, and an amount of energy for transfer; and transferring, based upon the accepted bid and using the identifying information, electrical energy from the electric vehicle having the surplus of electric energy to the purchasing electric vehicle having a deficit of electric energy;

in response to determining that the amount of energy available falls below the threshold, performing the following steps directly with respect to one or more other electric vehicles at least partly powered by electric power:

broadcasting the imbalance to one or more other electric vehicles, wherein the broadcasting comprises broadcasting a message regarding a deficit of energy over a wireless network of the electric vehicle;

said broadcasting comprising broadcasting an opening price to purchase surplus energy and an amount of energy corresponding to the deficit;

listening, using the wireless network, for one or more advertisements comprising bids to sell energy to redress the deficit from the one or more other electric vehicles, wherein the bids comprise a price with regard to the deficit;

deciding on whether to accept a bid from another electric vehicle, wherein the deciding comprises comparing the price of the bid with the opening price and accepting a bid associated based upon the price of the bid and a reliability of the another electric vehicle providing the bid;

collecting identifying information from a selling electric vehicle having a surplus of electric energy from which a bid is accepted, wherein the collecting comprises recording an identification of the electric vehicle from which a bid is accepted, an accepted price for the electrical energy, and an amount of energy for transfer; and transferring, based upon the accepted bid and using the identifying information, electrical energy from the selling electric vehicle having a surplus of electric energy to the electric vehicle having a deficit of electric energy.

12. The method according to claim 1, wherein the vehicle for which an electric energy imbalance is ascertained includes:

an energy storage arrangement;

an arrangement for measuring an amount of remaining charge in the energy storage arrangement;

an embedded computer which handles the bids;

a transceiver which communicates with the one or more other vehicles;

a user interface which permits interaction with respect to a human operator;

a perceivable unique identifier; and a localization system to assist in locating the vehicle for which an electric energy imbalance is ascertained with respect to at least one of the one or more other vehicles.

* * * * *